(12) United States Patent
Myers (10) Patent No.: US 7,942,434 B2
(45) Date of Patent: May 17, 2011

(54) DISENGAGEABLY COUPLED TAKE-APART BICYCLE FRAME

(76) Inventor: Brian T Myers, Albuquerque, NM (US)

( * ) Notice: Subject to any disclaimer, the term of this patent is extended or adjusted under 35 U.S.C. 154(b) by 106 days.

(21) Appl. No.: 12/436,338

(22) Filed: May 6, 2009

(65) Prior Publication Data

US 2009/0278332 A1 Nov. 12, 2009

Related U.S. Application Data

(60) Provisional application No. 61/126,804, filed on May 7, 2008.

(51) Int. Cl.
*B62K 15/00* (2006.01)
(52) U.S. Cl. .................. 280/287; 280/278
(58) Field of Classification Search .......... 280/287, 280/278
See application file for complete search history.

(56) References Cited

U.S. PATENT DOCUMENTS

| | | | | |
|---|---|---|---|---|
| 578,011 | A * | 3/1897 | Girardet | 280/287 |
| 3,294,416 | A * | 12/1966 | Carnielli | 280/278 |
| 3,304,099 | A | 2/1967 | Jankowski | |
| 3,359,012 | A * | 12/1967 | Westerheide | 280/287 |
| 3,512,816 | A * | 5/1970 | Katano | 403/102 |
| 3,739,451 | A | 6/1973 | Jacobson | |
| 3,791,672 | A * | 2/1974 | Pera | 280/287 |
| 3,865,403 | A * | 2/1975 | Majerus | 280/287 |
| 4,252,335 | A * | 2/1981 | Brenner | 280/287 |
| 4,336,958 | A | 6/1982 | Goetzinger | |
| 4,895,386 | A | 1/1990 | Hellestam | |
| 5,337,609 | A | 8/1994 | Hsu | |
| 5,360,225 | A | 11/1994 | Chen | |
| 5,431,507 | A | 7/1995 | Smilanick | |
| 5,586,652 | A | 12/1996 | Smilanick | |
| 5,772,228 | A | 6/1998 | Owyang | |
| 5,775,743 | A | 7/1998 | Rochelle | |
| 6,135,478 | A * | 10/2000 | Montague | 280/287 |
| 6,710,403 | B2 | 3/2004 | Dusevic | |
| 6,742,816 | B2 | 6/2004 | Rocheleau | |
| 6,854,752 | B2 | 2/2005 | Chao | |
| 6,886,844 | B2 | 5/2005 | Ritchey | |
| 6,886,845 | B2 | 5/2005 | Chao | |
| 6,929,277 | B2 * | 8/2005 | Chao | 280/278 |
| 7,080,847 | B2 | 7/2006 | Chao | |
| 7,175,192 | B1 * | 2/2007 | Lu | 280/287 |
| 7,232,143 | B1 * | 6/2007 | Ferguson et al. | 280/278 |
| 7,455,331 | B2 | 11/2008 | Gill | |
| 7,578,515 | B2 * | 8/2009 | Appleman | 280/287 |
| 7,775,539 | B2 * | 8/2010 | Menayan | 280/287 |
| 2005/0206121 | A1 | 9/2005 | Ritchey | |
| 2005/0285366 | A1 * | 12/2005 | Huang | 280/278 |
| 2006/0087095 | A1 * | 4/2006 | Huang | 280/278 |
| 2007/0029753 | A1 | 2/2007 | Ritchey | |

* cited by examiner

OTHER PUBLICATIONS

Bicycle Retailer & Industry News, Apr. 1, 2009, p. 27.

*Primary Examiner* — Paul N Dickson
*Assistant Examiner* — Marlon A Arce (57) ABSTRACT

A disengageably coupled bicycle frame, utilizing a device for coupling a first tube and a second tube, the tubes having terminal ends and tube faces defined by their terminal ends, the device comprising a first plate member having a first plate member face and a first plate member rear and a second plate member having a second plate member face and a second plate member rear, the first plate member rear fastened by a fastening means to a face of the first tube, the second plate member rear fastened by a fastening means to a face of the second tube, and the first and second plate members fastened face to face by a fastening means, the fastening means being other than a clamp, the plate members not hingedly attached.

37 Claims, 8 Drawing Sheets

DISENGAGEABLY COUPLED TAKE-APART BICYCLE FRAME

CROSS-REFERENCE TO RELATED APPLICATIONS

This application claims the benefit of provisional patent application Ser. No. 61/126,804, filed May 7, 2008 by the present inventor.

STATEMENTS REGARDING FEDERALLY SPONSORED RESEARCH AND DEVELOPMENT

Not applicable.

BACKGROUND

The embodiments of the present invention satisfy the needs of having bicycles that are dividable for travel or storage.

Information relevant to attempts to address these problems can be found in U.S. Pat. Nos. 4,252,335; 5,360,225; 5,431,507; 5,586,652; 5,772,228; 6,854,752; 6,886,844; 6,886,845; 6,929,277; 7,080,847; and U.S. Patent Applications 2005/0206121; and 2007/0029753; which are not admitted to be prior art with respect to the present invention by its mention in this Background Section. However, it is desirable to have a better device than is disclosed in the references.

Previously, bicycle frames that could be taken apart in two pieces (disengageably coupled frames) for travel and storage were made with couplers that worked only with round frame tubing. These round frame connectors or couplers were fabricated for certain diameters, and were made of steel, stainless steel or titanium, and had could not be used with tubing of other diameters such as oval, tear-dropped, etc, a limitation which constrained the shape, diameter, and type of materials used in take-apart bicycle frames (e.g., U.S. Pat. Nos. 5,586,652 and 5,431,507). A bicycle frame installed with the '652 or '507 couplers must be assembled or disassembled using a special wrench that cannot be easily replaced if lost white traveling, for instance. These couplers had to be fitted over or inserted into the frame tubing, which had to correspond to the diameter of said couplers. Steel or titanium couplers could only be used with round steel or titanium tubing. They could not be soldered or brazed onto aluminum, which is a popular material for lightweight bicycle frames. Aluminum couplers were not offered because said couplers incorporated threads in their design, and aluminum threads can strip more easily, since aluminum is a softer metal than steel or titanium A different design for a coupling mechanism for a two-piece bicycle frame is described in U.S. Pat. No. 6,886,844. This frame coupling design involves tubes which are coupled when elevated rims or lips on the joining edge of each tube are drawn together and secured by a clamp. This invention also works only with round bicycle tubing.

A number of designs exist for bicycles which fold or come apart for travel or storage, but there are limitations with those concepts. Folding bicycles tend to be heavier and can't be packed in a way to comply with common carrier size restrictions for non-oversized luggage. Cycling enthusiasts want to travel with bicycles that are light and reliable, and they also want to avoid oversize fees charged by common carriers on luggage such as bicycle cases that exceeds certain dimensions. Designs exist for standard-sized bicycles which come apart in several pieces and can be packed to meet standard-sized luggage requirements. However, the designs are based on frame connectors or couplers that are only meant to be used with round tubing. The bicycle industry has shifted away from using round tubing in favor of a variety of tubing shapes, for reasons including aerodynamics, strength and aesthetics. Now, bicycle builders and engineers prefer to incorporate shaped tubing in bicycle designs that address issues such as frame stress points and aerodynamics. Many cyclists also find shaped tubing more attractive, and prefer lightweight frame material such as aluminum or composite materials such as carbon fiber. The round couplers and clamps will not work with shaped tubing preferred by bicycle designers and enthusiasts.

The embodiments of the present invention may be used on any shape of tubing for a dividable bicycle frame. Also, none of the relevant art teaches bicycle frame couplings that can be attached to tubing by a variety of methods, including soldering, welding or bonding.

Thus several advantages of one or more aspects of my divided bicycle design are to provide a divided bicycle that is not limited to type of bicycle tubing, and that can incorporate a variety of frame tubing shapes and materials. These and other advantages of one or more aspects will become apparent from a consideration of the ensuing description and accompanying drawings.

SUMMARY

The embodiments of the present invention are directed to an apparatus that satisfies the needs set out in the Background section.

Some Advantages of the Embodiments of the Invention

In accordance with one embodiment, a bicycle frame is disengageably connected in at least one location by at least one pair of planar plates or coupling joints. In this embodiment, installation of coupling plates allows a standard bicycle with standard wheels to be temporarily divided into two pieces. The plate pairs are versatile in that they can be used with and attached to a variety of materials, so that a bicycle frame can be made of materials that include aluminum, carbon fiber, steel and titanium. A plate pair replaces a portion of a frame tube, and can be used with various diameters and shapes of bicycle tubing. When planar plate pairs connect frame tubing, they preserve the original geometry and stiffness of the frame.

A frame builder or manufacturer can use my plate system to produce divided bicycle frames according to their preference of material and shape of tubing.

My plate system is less expensive and difficult to fabricate, unlike relevant art round frame couplers that must be fabricated using CNC machinery. My plates can be fabricated on a small scale using hand power toots.

A consumer can assemble or disassemble a frame divided with plate pairs using a standard metric wrench, which can be easily replaced if lost white traveling, for instance.

My planar plate system can be used to build a divided frame for a bicycle that can be disassembled and packed to meet standard luggage size requirements for common carriers.

The plate design permits the use of a variety of shapes and materials for bicycle tubing. Bicycle builders can incorporate my plate system into frames that utilize popular bicycle tubing designs and sizes.

The plate design permits a disengageably coupled bicycle frame that is rigid and strong.

The plate design requires a standard metric wrench to assemble and disassemble a divided frame.

The plate design permits a disengageably coupled bicycle that can be packed as standard-sized luggage to avoid common carrier oversize fees.

A frame builder or someone who is a skilled metal worker can easily fabricate plates that work with the shape and size of tubing they specify. Existing prior art bicycle frame couplers that are commercially available are expensive to duplicate because CNC machining is required.

DRAWINGS

These and other features, aspects and advantages of the embodiments of the device and/or methods will become better understood with reference to the following description, appended claim and accompanying drawings where:

REFERENCE NUMERALS FOR DRAWINGS tube segment 19
seat tube 20
seat tube proximal end 21
seat tube distal end 22
distal bracket 23
head tube 24
forward assembly 30
forward wheel 31
wheel forks 32
forward 33 and rearward 34 sections of forward assembly proximal tubes 35 and
forward assembly distal tubes 36
forward end 37
rearward end 38
split 39
rear assembly 40
rear wheel 41
rear assembly proximal tube 42
rear assembly distal tube 43
forward terminal end 44
rearward terminal end 45
first coupling assembly 50
second coupling assembly 51
first plate member 52
first plate member face 53
first plate member rear 54
second plate member 55
second plate member face 56
second plate member rear 57
opening 58
axial bolts 59
nuts 60
seating projections 61
seating recesses 62
forward terminal end 70
rearward terminal end 71
first tube 80
second tube 81
terminal ends 82
tube face 83
shoulder portion 84
plate member tubes 85

DESCRIPTION

Definitions

Tubes or tubing means the components of a bicycle frame. Bicycle frame tubing can be made from carbon fiber and composite materials, and aluminum, steel and other metals and combinations of metals. Bicycle frame tubes come in a variety of cross-sections; they come in cross-sections of any shape, not just circular or annular, but also other shapes including but not limited to oval, tear drop, triangular, and keyhole.

The embodiments of the invention utilize a standard bicycle frame, such as that disclosed at http://en.wikipedia.org/wiki/Bicycle frame.

The forward assembly proximal tube is also called the top tube.

The forward assembly distal tube is also called the down tube.

The rear assembly proximal tube is also called the seat stay.

The rear assembly distal tube is also called the chain stay.

Description of the Preferred Embodiment

Referring now to the drawings FIGS. 1 through 5, the preferred embodiment of the invention is a detectably joinable bicycle frame comprising:

A. a seat tube 20 having a proximal end 21 and a distal end 22, the distal end terminating at a distal bracket 23, B. a forward assembly 30 supported by a head tube 24 and wheel forks 32 and a forward wheel 31, the forward assembly 30 containing forward 33 and rearward 34 sections of a forward assembly proximal tube 35 and a forward assembly distal tube 36, the forward assembly tubes 35, 36 having longitudinal axes and forward and rearward terminal ends 70, 71, the forward assembly tubes 35, 36 being split transversely perpendicularly to longitudinal axes of the forward assembly tubes 35, 36, each forward assembly tube 35, 36 having substantially uniform cross sections of any shape, each split 39 dividing each forward assembly tube 35, 36 into the forward 33 and rearward 34 sections, the forward 33 and rearward 34 sections of not necessarily equal lengths, each forward section 33 of each split forward assembly proximal tube 35 and split forward assembly distal tube 36 being formed of integral pieces, each rearward section 34 of each split forward assembly proximal tube 35 and forward assembly distal tube 36 being formed of integral pieces, the forward sections 33 of the split forward assembly proximal tube 35 and distal tube 36 each having a forward end 37 and a rearward end 38, the forward ends 37 of the forward sections 33 terminating either near one another or together at the head tube 24, the rearward end 38 of the forward assembly proximal tube 35 terminating generally at the seat tube proximal end 21, the rearward end 38 of the forward assembly distal tube 36 intersecting and terminating at the seat tube distal end 22 at the distal bracket 23, C. a rear assembly 40 supported by a rear wheel 41 and containing paired rear assembly proximal tubes 42 and paired rear assembly distal tubes 43, each rear assembly tube having substantially uniform cross sections of any shape, each rear assembly tube having a forward terminal end 44 and a rearward terminal end 45, the rear assembly tubes 42, 43 meeting at their rearward terminal ends 45, the forward terminal end 44 of each rear assembly proximal tube 43 terminating on the seat tube 20 at or near the point where the rearward section of the forward assembly proximal tube 35 intersects the seat tube 20, the forward terminal end of each rear assembly distal tube terminating at the distal bracket, D. a first coupling assembly 50 for detectably joining the forward 33 and rearward 34 sections of the forward assembly proximal tube 35, a second coupling assembly 51 of like structure as the first coupling assembly 50 for detectably joining the forward 33 and rearward 34 sections of the forward assembly distal tube 36, the first coupling assembly 50 and the second coupling assembly 51 each comprising a first plate member 52 having a first plate member face 53 and a first plate member rear 54 and a second plate member 55 having a second plate member face 56 and a second plate member rear 57, each plate member having a predetermined shape and having two ends with at least one opening 58 in one end and at least one opening 58 in the other end, the openings 58 dimensioned to accept mounting bolts, the openings 58 having no shoulder 84 portions extending from and integral to the plate members, wherein in the first coupling assembly 50 the first plate rear 54 is fastened by a fastening means to the rearward end 38 of the forward section 33 of the split forward assembly proximal tube 35, the second plate rear 57 is fastened by a fastening means to the forward end 37 of the rearward section 34 of the split forward assembly proximal tube 35, and the first 52 and second 55 plate members are fastened face 53 to face 56 by a fastening means, the fastening means being other than a clamp, the plate members 52, 55 not hingedly attached to each other, the plate members completely seating off the tubes, and and wherein in the second coupling assembly 51 the first plate rear 54 is fastened by a fastening means to the rearward end 38 of the forward section 33 of the split forward assembly distal tube 36, the second plate rear 57 is fastened by a fastening means to the forward end 37 of the rearward section 34 of the split forward assembly distal tube 36, and the first 52 and second 55 plate members are fastened face 53 to face 56 by a fastening means, the fastening means being other than a clamp, the plate members 52, 55 not hingedly attached to each other, the plate members completely seating off the tubes.

Figure 1:
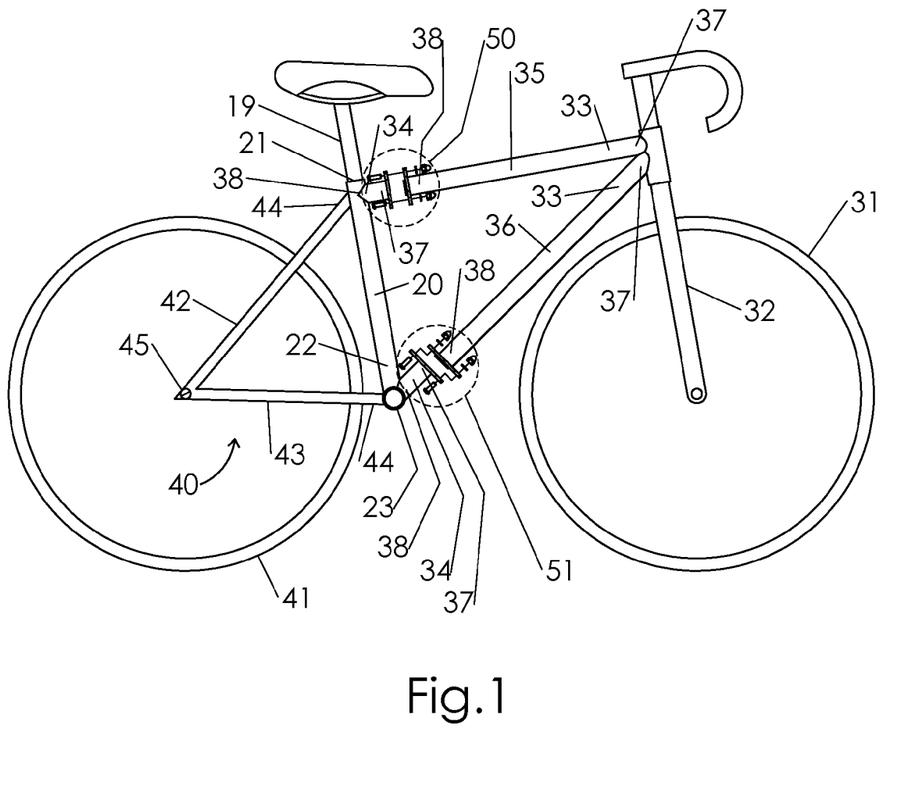
FIG. 1 shows a side view of the preferred embodiment of the invention.

In the preferred embodiment, the forward assembly tubes are split transversely perpendicularly to longitudinal axes of the tubes.

Alternatively, the forward assembly tubes are split not transversely perpendicularly to longitudinal axes of the tubes In the preferred embodiment, the distance between the first coupling assembly 50 and the seat tube 20 is 35 mm, and the distance between the second coupling assembly 51 and the distal bracket is 35 mm.

Figure 2:
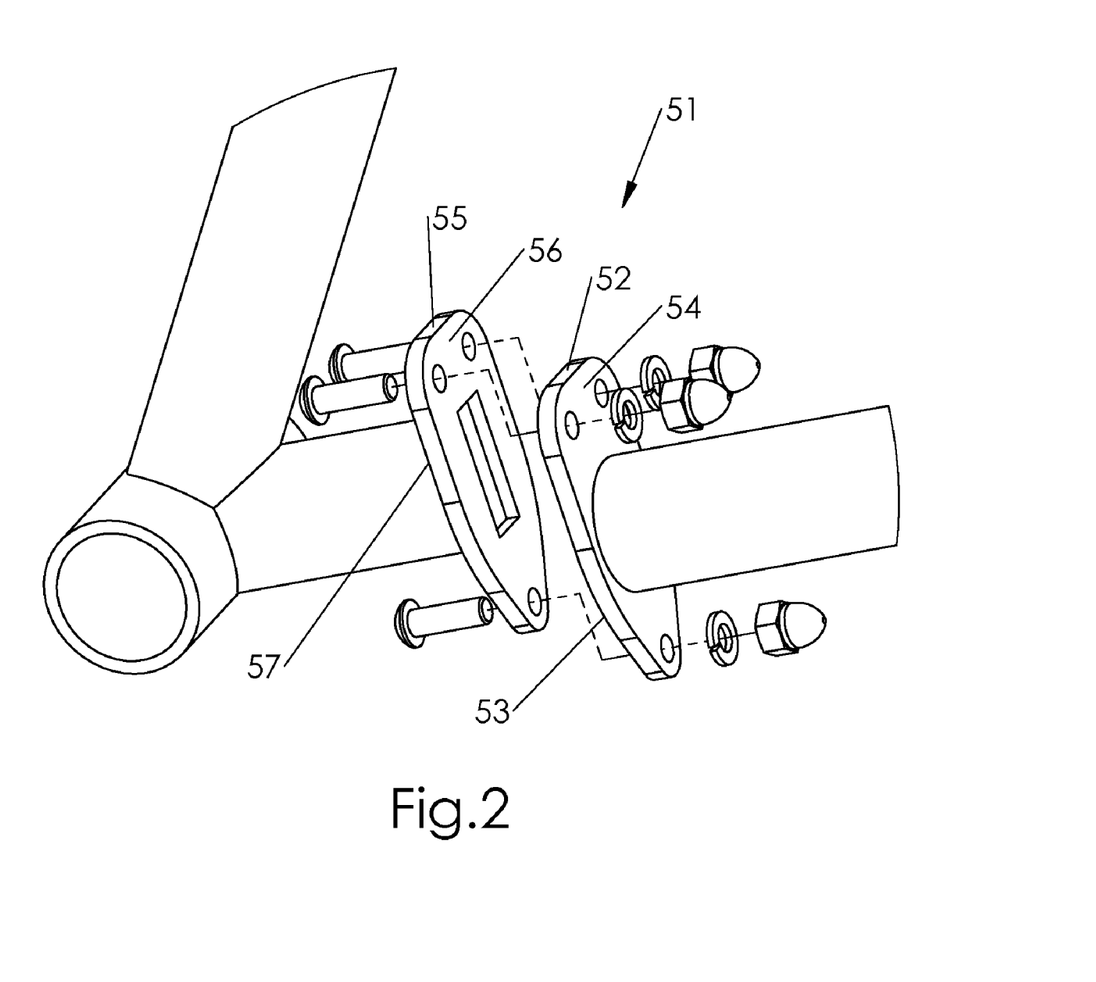
FIG. 2 shows an exploded view of a coupling assembly.
Figure 3:
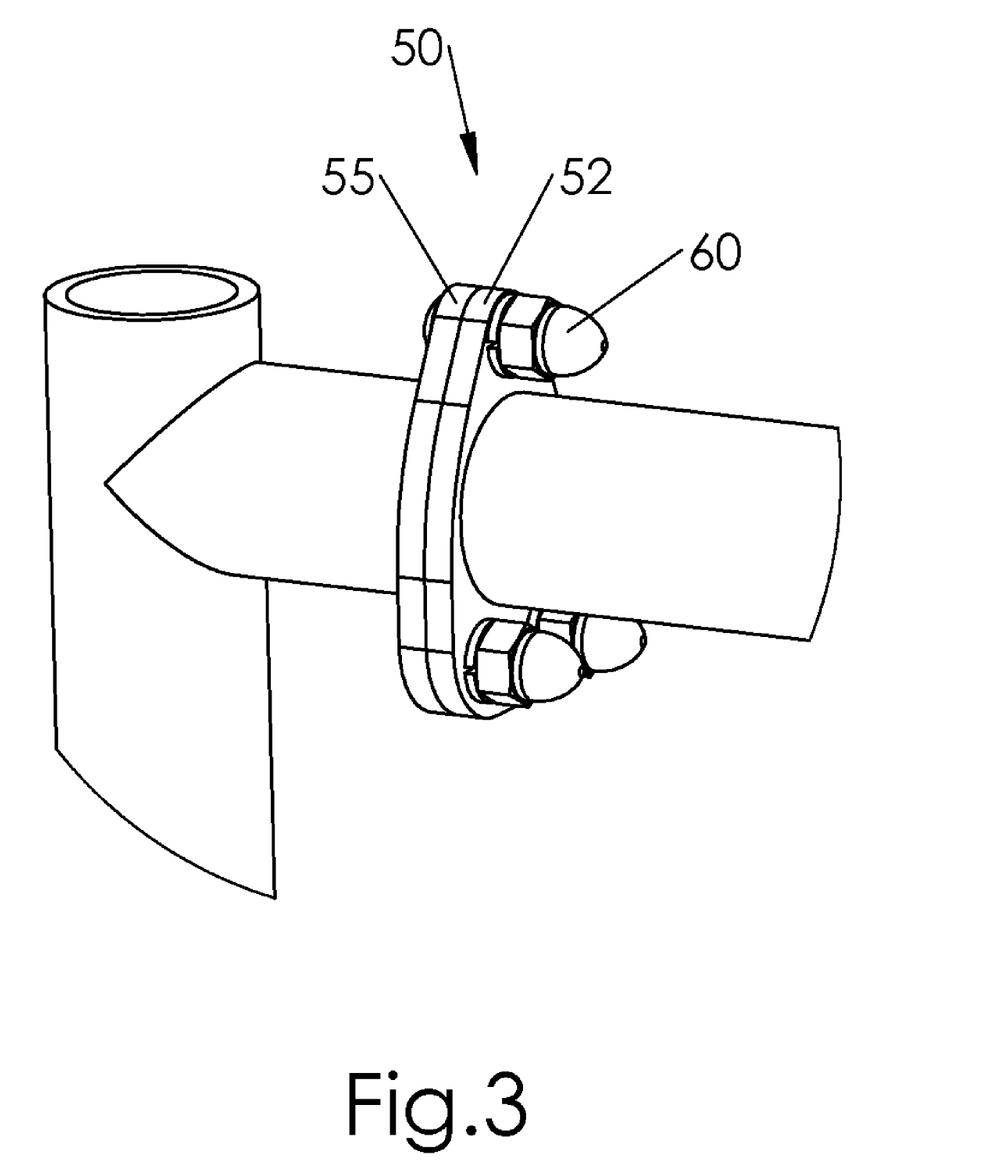
FIG. 3 shows a perspective view of a coupling assembly.

In the preferred embodiment, the means for fastening the plate member rears 54, 57 to the ends 38, 37 of the tubes 35, 36 is selected from the group consisting of pressing, welding, adhering, and bonding.

In the preferred embodiment, the means for fastening the first and second plate members 52, 55 face to face 53, 56 comprises nuts 60 and bolts 59.

In the preferred embodiment, each plate face 53, 56 further comprises at least one seating projection 61 and at least one seating recess 62.

In an alternate embodiment, the coupling assemblies 50, 51 each comprise two pipe flanges.

In the preferred embodiment, the plate members 52, 55 have triangular-shaped faces.

In the preferred embodiment, the plate members 52, 55 have heart-shaped faces.

In the preferred embodiment, each tube 20, 35, 36, 42, 43 has a cross section taken perpendicular to the longitudinal axis of each tube 20, 35, 36, 42, 43, which cross sections are other than circular.

Optionally, the openings 58 have shoulder portions 84 extending from and integral to the plate member rears 54, 57.

Optionally, the openings 58 have shoulder portions 84 extending from and integral to the plate member faces 53, 56.

Optionally, the shoulder portions 84 further comprise seating projections, and the openings 58 in the plate member faces 53, 56 further comprise seating recesses.

In an alternate embodiment, the plate members 52, 55 monolithically extend from the tubes 20, 35, 36, 42, 43 that the plate members fasten together.

In an alternate embodiment, the plate member rears 54, 57 further comprise plate member tubes adapted for inserting into forward and rearward sections of forward assembly tubes, the plate member tubes monolithically extending from the plate member rears 54, 57.

In this alternate embodiment, the plate member rears further comprise plate member tubes adapted for inserting over forward and rearward sections of forward assembly tubes, the plate member tubes monolithically extending from the plate member rears.

In this alternate embodiment, the tubes are made of a material selected from the group consisting of aluminum, aluminum alloy, carbon fiber, steel and titanium.

Description of an Alternate Embodiment

Figure 4:
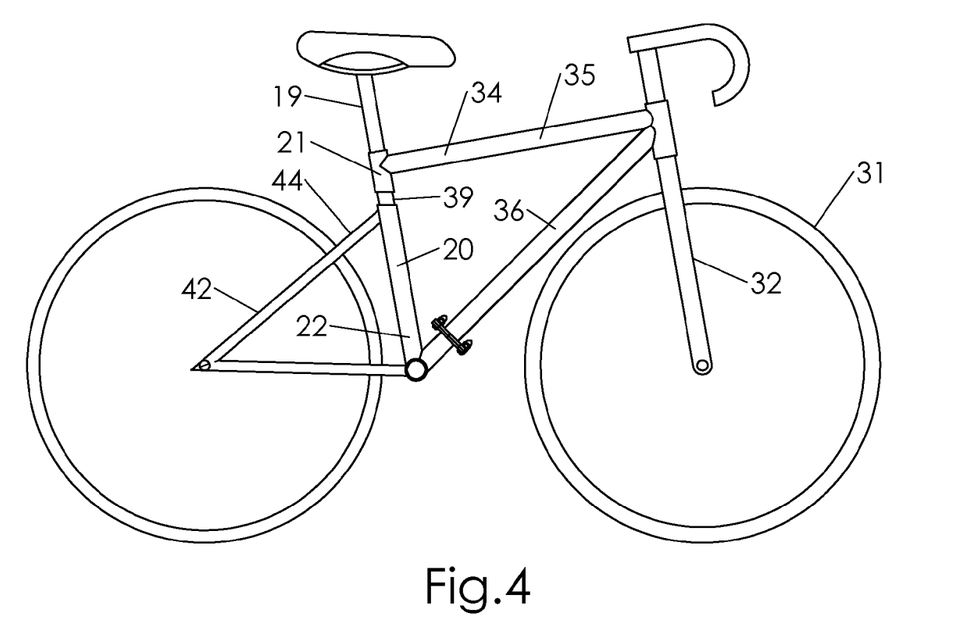
FIG. 4 shows a side view of an alternate embodiment of the invention.
Figure 5:
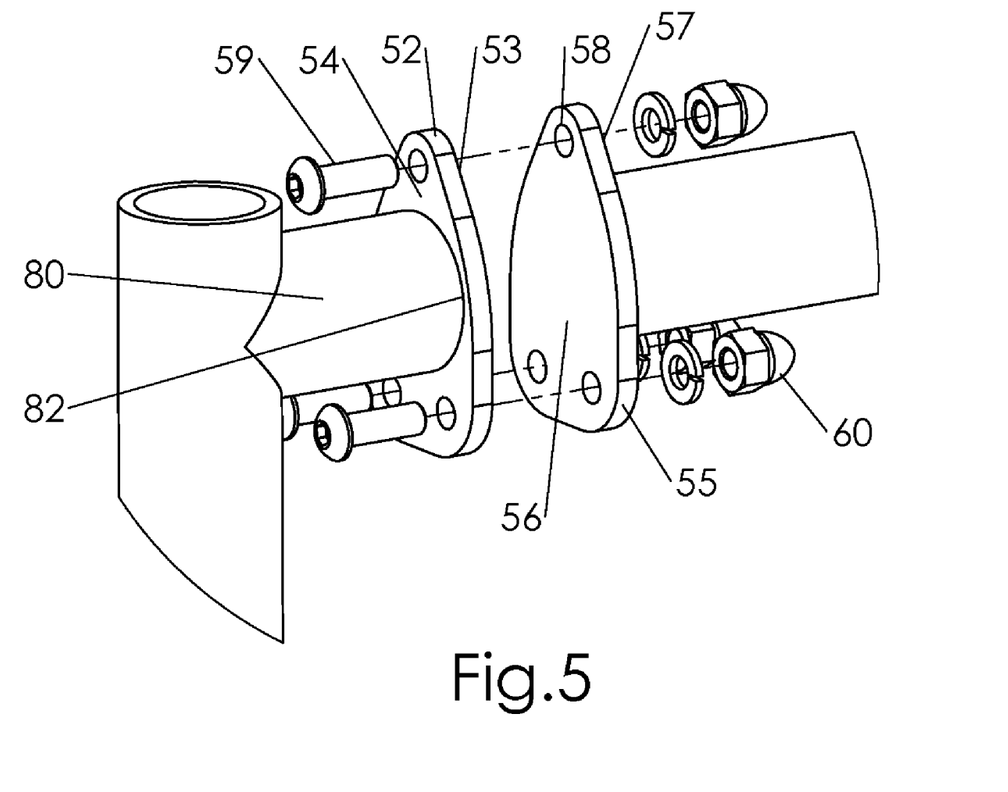
FIGS. 5-8 show perspective views of coupling assemblies.

An alternate embodiment of the invention is a detectably joinable bicycle frame comprising:

A. a seat tube 20 having a proximal end 21 and a distal end 22, the distal end 22 terminating at a distal bracket 23, B. a forward assembly 30 supported by a head tube 24 and wheel forks 32 and a forward wheel 31, the forward assembly 30 containing forward 33 and rearward 34 sections of a forward assembly proximal tube 35 and a forward assembly distal tube 36, the forward assembly tubes 35, 36 having longitudinal axes and forward and rearward terminal ends 70, 71, the forward assembly distal tube 36 being split transversely perpendicularly to longitudinal axes of the forward assembly distal tube 35, 36, each forward assembly tube 35, 36 having substantially uniform cross sections of any shape, the split 39 dividing the distal tube 36 into the forward 33 and rearward 34 sections, the forward 33 and rearward 34 sections of not necessarily equal lengths, the forward section 33 of the split forward assembly distal tube 36 being formed of integral pieces, the rearward section 34 of the split forward assembly distal tube 36 being formed of integral pieces, the forward section 33 of the split forward assembly distal tube 36 having a forward end 37 and a rearward end 38, the forward ends 37 of the forward sections 33 terminating either near one another or together at the head tube 24, the rearward section 34 of the forward assembly distal tube 36 intersecting and terminating at the seat tube distal end 22 at the distal bracket 23, C. a rear assembly 40 supported by a rear wheel 41 and containing paired rear assembly proximal tubes 42 and paired rear assembly distal tubes 43, each rear assembly tube 42, 43 having substantially uniform cross sections of any shape, each rear assembly tube 42, 43 having a forward terminal end 44 and a rearward terminal end 45, the rear assembly tubes 42, 43 meeting at or near their rearward terminal ends 45, the forward terminal end 44 of each rear assembly proximal tube 42 terminating on the seat tube 20 below where the rearward section 34 of the forward assembly proximal tube 36 intersects the seat tube 20, the forward terminal end of each rear assembly distal tube terminating at the distal bracket, D. a coupling assembly 51 for detachably joining the forward and rearward sections 33, 34 of the forward assembly distal tube 36, the coupling assembly 51 comprising a first plate member 52 having a first plate member face 53 and a first plate member rear 54 and a second plate member 55 having a second plate member face 56 and a second plate member rear 57, each plate member having a predetermined shape and having two ends with at least one opening 58 in one end and at least one opening 58 in the other end, the openings 58 dimensioned to accept mounting bolts, each plate member having no shoulder 84 portion extending from and integral to the plate member, wherein the first plate rear 54 is fastened by a fastening means to the rearward end 38 of the forward section 33 of the split forward assembly distal tube 36, the second plate rear 57 is fastened by a fastening means to the forward end 37 of the rearward section 34 of the split forward assembly distal tube 36, and the first 52 and second 55 plate members are fastened face 53 to face 56 by a fastening means, the fastening means being other than a clamp, the plate members 52, 55 not hingedly attached to each other, the openings 58 having no shoulder 84 portions extending from and integral to the plate members, the plate members 52, 55 not hingedly attached to each other, the plate members completely seating off the tubes, and E. the seat tube 20 being split into a seat tube proximal end 21 and a seat tube distal end 22, the split 39 being along a cross-section above where the forward terminal end 44 of each rear assembly proximal tube 42 intersects the seat tube 20 and below where the rearward section 34 of the forward assembly proximal tube 35 intersects the seat tube 20, the seat tube proximal end 21 being disengageably coupled with the seat tube distal end 22 by a coupling means.

In this alternative, the forward assembly distal tubes are split transversely perpendicularly to longitudinal axes of the tubes.

Alternatively, the forward assembly distal tubes are split not transversely perpendicularly to longitudinal axes of the tubes.

In this alternate embodiment, the distance between the coupling assembly 51 and the distal bracket 23 is 35 mm.

In this alternate embodiment, the means for fastening the plate member rears 54, 57 to the ends 37, 38 of the tube 36 is selected from the group consisting of pressing, welding, adhering, and bonding.

In this alternate embodiment, the means for fastening the first and second plate members 52, 55 face to face 53, 56 comprises nuts 60 and bolts 59.

In this alternate embodiment, each plate face 53, 56 further comprises at least one seating projection 61 and at least one seating recess 62.

In this alternate embodiment, the coupling assembly on the split forward distal tube comprises two pipe flanges.

In this alternate embodiment, the plate members 52, 55 have triangular-shaped faces.

In this alternate embodiment, the plate members 52, 55 have heart-shaped faces.

In this alternate embodiment, each tube 20, 35, 36, 42, 43 has a cross section taken perpendicular to the longitudinal axis of each tube 20, 35, 36, 42, 43, which cross sections are other than circular.

In this alternate embodiment, the coupling means for coupling the seat tube proximal end with the seat tube distal end is a coupling assembly.

In this alternate embodiment, the coupling means for coupling the seat tube proximal end with the seat tube distal end is a tube segment 19 insertable into the seat tube proximal end and the seat tube distal end, the seat tube and tube segment having non-circular cross-sections.

Optionally, the coupling means for coupling the seat tube proximal end with the seat tube distal end is a tube segment insertable into the seat tube proximal end and the seat tube distal end, the seat tube and tube segment having circular cross-sections for at least the length of the tube segment insertion. The tube segment can be a seat post.

Optionally, the openings 58 have shoulder portions 84 extending from and integral to the plate member rears 54, 57.

Optionally, the openings 58 have shoulder portions 84 extending from and integral to the plate member faces 53, 56.

Optionally, the shoulder portions 84 further comprise seating projections, and the openings 58 in the plate member faces 53, 56 further comprise seating recesses.

In an alternate embodiment, the plate members 52, 55 monolithically extend from the tubes that the plate members fasten together.

In an alternate embodiment, the plate member rears 54, 57 further comprise plate member tubes 85 adapted for inserting into forward and rearward sections of forward assembly tubes, the plate member tubes 85 monolithically extending from the plate member rears 54, 57.

In this alternate embodiment, the plate member rears further comprise plate member tubes adapted for inserting over forward and rearward sections of forward assembly tubes, the plate member tubes monolithically extending from the plate member rears.

In this alternate embodiment, the tubes are made of a material selected from the group consisting of aluminum, aluminum alloy, carbon fiber, steel and titanium.

Figure 6:
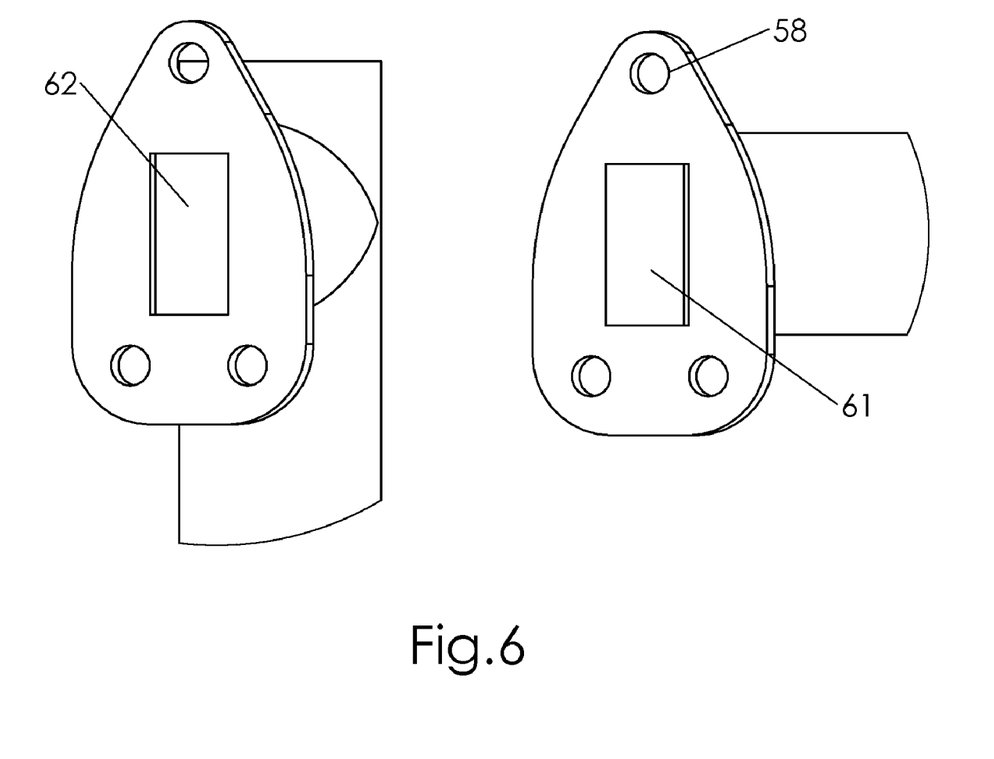
Figure 7:
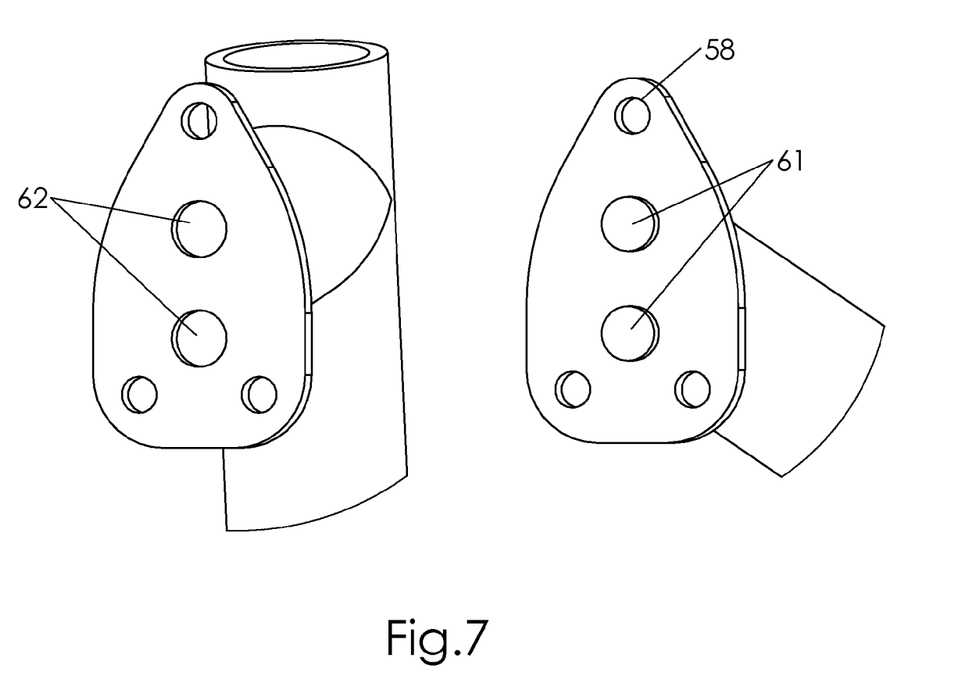
Figure 8:
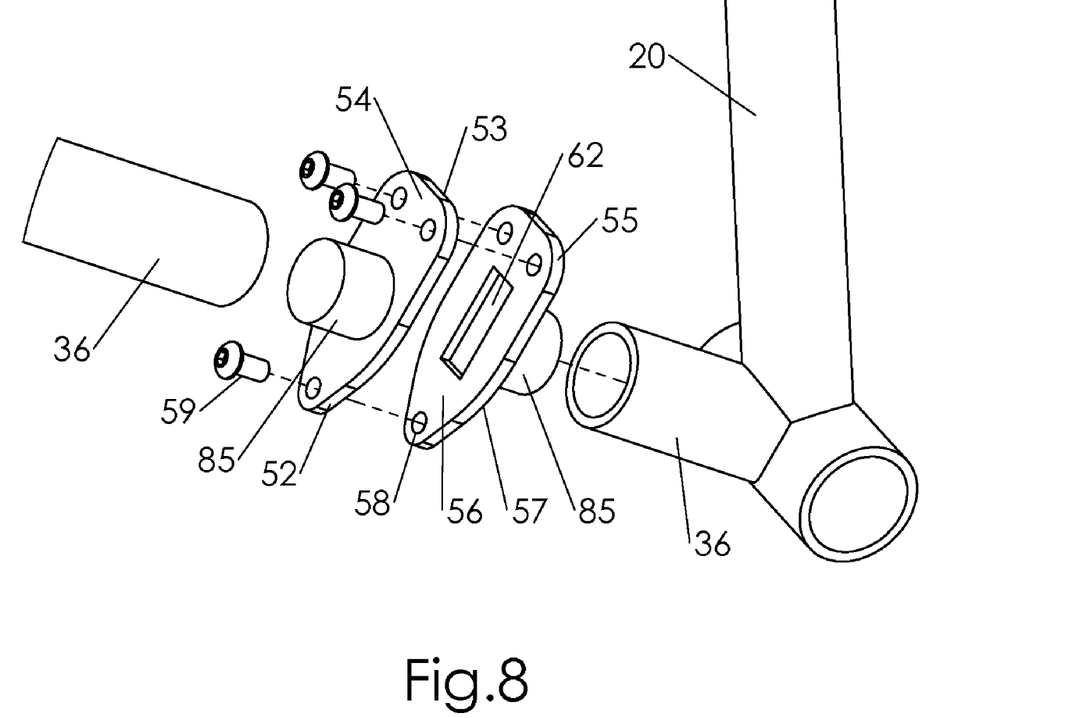

As shown in FIGS. 6 through 8, the embodiments of the present invention also comprise a device for coupling a first tube 80 and a second tube 81, each tube 80, 81 having substantially uniform cross sections of any shape and having circular cross sections in some alternate embodiments, the tubes 80, 81 having terminal ends 82 and tube faces 83 defined by their terminal ends 82, the device comprising a first plate member 52 having a first plate member face 53 and a first plate member rear 54 and a second plate member 55 having a second plate member face 56 and a second plate member rear 57, each plate member having a predetermined shape and having two ends, at least one opening in one end and at least one opening in the other end, the openings dimensioned to accept mounting bolts, the openings having no shoulder 84 portions extending from and integral to the plate members, the first plate member rear 54 fastened by a fastening means to a face 83 of the first tube 80, the second plate member rear 57 fastened by a fastening means to a face 83 of the second tube 81, and the first and second plate members 52, 55 fastened face to face 53, 56 by a fastening means, the fastening means being other than a clamp, the plate members 52, 55 not hingedly attached to each other, the plate members completely seating off the tubes, each plate member having a predetermined shape and having two ends with at least two openings in one end and at least one opening in the other end, the openings dimensioned to accept mounting bolts, the openings having no shoulder portions extending from and integral to the plate members.

In this alternate embodiment, the means for fastening the plate member rears 54, 57 to the faces 83 of the tubes is selected from the group consisting of pressing, welding, adhering, and bonding.

In this alternate embodiment, the means for fastening the first and second plate members 52, 55 face to face 53, 56 comprises nuts 60 and bolts 59.

In this alternate embodiment, each plate member 52, 55 further comprises at least one seating projection 61 and at least one seating recess 62.

In this alternate embodiment, the plate members 52, 55 have triangular-shaped faces.

In this alternate embodiment, the plate members 52, 55 have heart-shaped faces.

Optionally, the openings 58 have shoulder portions 84 extending from and integral to the plate member rears 54, 57.

Optionally, the openings 58 have shoulder portions 84 extending from and integral to the plate member faces 53, 56.

Optionally, the shoulder portions 84 further comprise seating projections, and the openings 58 in the plate member faces 53, 56 further comprise seating recesses.

In this alternate embodiment, the plate member rears 54, 57 further comprise plate member tubes adapted for inserting into forward and rearward sections of forward assembly tubes, the plate member tubes monolithically extending from the plate member rears 54, 57.

In this alternate embodiment, the plate member rears further comprise plate member tubes adapted for inserting over forward and rearward sections of forward assembly tubes, the plate member tubes monolithically extending from the plate member rears.

In this alternate embodiment, the plate members are made of a material selected from the group consisting of aluminum, aluminum alloy, carbon fiber, steel and titanium.

Method for Using the Embodiments of the Invention

The bicycle can be taken apart in pieces for packing or storage, and when it is reassembled and the plates tightened together, the frame's original geometry and rigidity is restored. In addition, the divided bicycle can be packed in a case or box small enough to meet common carriers' size requirements for standard luggage, thus escaping fees imposed on oversized luggage. Common carriers such as airlines define standard-sized luggage as no more than 62 linear inches in height, width and girth.

Some advantages of the embodiments of the apparatus were previously enumerated in the Summary section. Every advantageous feature does not need to be incorporated into every embodiment of the apparatus and/or methods.

Although these versions of the invention have been described in considerable detail, other versions are possible. For example, tubing and plate materials and dimensions can vary; plate connecting elements such as fasteners, fastener locks, projecting and indented sections and receptacles can vary in shape, size, number and other specifications; and embodiments can comprise combinations of the features described herein, such as combinations of the dependent claims. Therefore, the spirit and scope of the appended claims should not be limited to the description of the versions contained therein.

I claim:

1. A detectably joinable bicycle frame comprising:
A. a seat tube having a proximal end and a distal end, the distal end terminating at a distal bracket,
B. a forward assembly supported by a head tube and wheel forks and a forward wheel, the forward assembly containing forward and rearward sections of a forward assembly proximal tube and a forward assembly distal tube, the forward assembly tubes having longitudinal axes and forward and rearward terminal ends, the forward assembly tubes being split, each forward assembly tube having substantially uniform cross sections of any shape, each split dividing each forward assembly tube into the forward and rearward sections, the forward and rearward sections of not necessarily equal lengths, each forward section of each split forward assembly proximal tube and split forward assembly distal tube being formed of integral pieces, each rearward section of each split forward assembly proximal tube and forward assembly distal tube being formed of integral pieces, the forward sections of each split forward assembly proximal tube and distal tube each having a forward end and a rearward end, the forward ends of the forward sections terminating either near one another or together at the head tube, the rearward end of the forward assembly proximal tube terminating generally at the seat tube proximal end, the rearward end of the forward assembly distal tube intersecting and terminating at the seat tube distal end at the distal bracket,
C. a rear assembly supported by a rear wheel and containing paired rear assembly proximal tubes and paired rear assembly distal tubes, each rear assembly tube having substantially uniform cross sections of any shape, each tube having a forward terminal end and a rearward terminal end, the rear assembly tubes meeting at their rearward terminal ends, the forward terminal end of each rear assembly proximal tube terminating on the seat tube at or near the point where the rearward section of the forward assembly proximal tube intersects the seat tube, the forward terminal end of each rear assembly distal tube terminating at the distal bracket,
D. a first coupling assembly for detachably joining the forward and rearward sections of the forward assembly proximal tube, a second coupling assembly of like structure as the first coupling assembly for detachably joining the forward and rearward sections of the forward assembly distal tube, the first coupling assembly and the second coupling assembly each comprising a first plate member having a first plate member face and a first plate member rear and a second plate member having a second plate member face and a second plate member rear, each plate member having a predetermined shape and having two ends with at least one opening in one end and at least one opening in the other end, the openings dimensioned to accept mounting bolts, the openings having no shoulder portions extending from and integral to the plate members, wherein in the first coupling assembly the first plate member rear is fastened by a fastening means to the rearward end of the forward section of the split forward assembly proximal tube, the second plate member rear is fastened by a fastening means to the forward end of the rearward section of the split forward assembly proximal tube, the first and second plate members are fastened face to face by a fastening means, the fastening means being other than a clamp, the plate members not hingedly attached to each other, the plate members completely seating off the tubes, and wherein in the second coupling assembly the first plate rear is fastened by a fastening means to the rearward end of the forward section of the split forward assembly distal tube, the second plate rear is fastened by a fastening means to the forward end of the rearward section of the split forward assembly distal tube, and the first and second plate members are fastened face to face by a fastening means, the fastening means being other than a clamp, the plate members not hingedly attached to each other, the plate members completely seating off the tubes.

2. The device of claim 1, wherein the forward assembly tubes are split transversely perpendicularly to longitudinal axes of the tubes.

3. The device of claim 1, wherein the the forward assembly tubes are split not transversely perpendicularly to longitudinal axes of the tubes.

4. The device of claim 1, wherein the distance between the first coupling assembly and the seat tube is 35 mm, and the distance between the second coupling assembly and the distal bracket is 35 mm.

5. The device of claim 1, wherein the means for fastening the plate member rears to the ends of the tubes is selected from the group consisting of pressing, welding, adhering, and bonding.

6. The device of claim 1, wherein the means for fastening the first and second plate members face to face comprises nuts and bolts.

7. The device of claim 1, wherein each plate face further comprises at least one seating projection and at least one seating recess.

8. The device of claim 1, wherein the coupling assemblies each comprise two pipe flanges.

9. The device of claim 1, wherein the plate members monolithically extend from the tubes that the plate members fasten together.

10. The device of claim 1, wherein the plate members have triangular-shaped faces.

11. The device of claim 1, wherein the plate members have heart-shaped faces.

12. The device of claim 1, wherein the openings have shoulder portions extending from and integral to the plate member rears.

13. The device of claim 1, wherein the openings have shoulder portions extending from and integral to the plate member faces.

14. The device of claim 13, wherein the shoulder portions further comprise seating projections, and the openings in the plate member faces further comprise seating recesses.

15. The device of claim 1, wherein the plate member rears further comprise plate member tubes adapted for inserting into forward and rearward sections of forward assembly tubes, the plate member tubes monolithically extending from the plate member rears.

16. The device of claim 1, wherein the plate member rears further comprise plate member tubes adapted for inserting over forward and rearward sections of forward assembly tubes, the plate member tubes monolithically extending from the plate member rears.

17. The device of claim 1, wherein the tubes are made of a material selected from the group consisting of aluminum, aluminum alloy, carbon fiber, steel and titanium.

18. A detectably joinable bicycle frame comprising:
A. a seat tube having a proximal end and a distal end, the distal end terminating at a distal bracket,
B. a forward assembly supported by a head tube and wheel forks and a forward wheel, the forward assembly containing forward and rearward sections of a forward assembly proximal tube and a forward assembly distal tube, the forward assembly tubes having longitudinal axes and forward and rearward terminal ends, the forward assembly distal tube being split, each forward assembly tube having substantially uniform cross sections of any shape, the split dividing the distal tube into the forward and rearward sections, the forward and rearward sections of not necessarily equal lengths, the forward section of the split forward assembly distal tube being formed of integral pieces, the rearward section of the split forward assembly distal tube being formed of integral pieces, the forward section of the split forward assembly distal tube having a forward end and a rearward end, the forward ends of the forward sections terminating either near one another or together at the head tube, the rearward section of the forward assembly distal tube intersecting and terminating at the seat tube distal end at the distal bracket,
C. a rear assembly supported by a rear wheel and containing paired rear assembly proximal tubes and paired rear assembly distal tubes, each rear assembly tube having substantially uniform cross sections of any shape, each rear assembly tube having a forward terminal end and a rearward terminal end, the rear assembly tubes meeting at their rearward terminal ends, the forward terminal end of each rear assembly proximal tube terminating on the seat tube below where the rearward section of the forward assembly proximal tube intersects the seat tube, the forward terminal end of each rear assembly distal tube terminating at the distal bracket,
D. a coupling assembly for detachably joining the forward and rearward sections of the forward assembly distal tube, the coupling assembly comprising a first plate member having a first plate member face and a first plate member rear and a second plate member having a second plate member face and a second plate member rear, each plate member having a predetermined shape and having two ends with at least one opening in one end and at least one opening in the other end, the openings dimensioned to accept mounting bolts, the openings having no shoulder portions extending from and integral to the plate members,
wherein the first plate rear is fastened by a fastening means to the rearward end of the forward section of the split forward assembly distal tube, the second plate member rear is fastened to the forward end of the rearward section of the split forward assembly distal tube, the first and second plate members are fastened face to face by a fastening means, the fastening means being other than a clamp, the plate members not hingedly attached to each other, the plate members completely seating off the tubes, and
E. the seat tube being split into a seat tube proximal end and a seat tube distal end, the split being along a cross-section above where the forward terminal end of each rear assembly proximal tube intersects the seat tube and below where the rearward section of the forward assembly proximal tube intersects the seat tube, the seat tube proximal end being disengageably coupled with the seat tube distal end by a coupling means.

19. The device of claim 18, wherein the forward assembly distal tubes are split transversely perpendicularly to longitudinal axes of the tubes.

20. The device of claim 18, wherein the the forward assembly distal tubes are split not transversely perpendicularly to longitudinal axes of the tubes.

21. The device of claim 18, wherein the distance between the coupling assembly and the distal bracket is 35 mm.

22. The device of claim 18, wherein the means for fastening the plate member rears to the ends of the tube is selected from the group consisting of pressing, welding, adhering, and bonding.

23. The device of claim 18, wherein the means for fastening the first and second plate members face to face comprises nuts and bolts.

24. The device of claim 18, wherein each plate member face further comprises at least one seating projection and at least one seating recess.

25. The device of claim 18, wherein the coupling assembly on the split forward assembly distal tube comprises two pipe flanges.

26. The device of claim 18, wherein the plate members have triangular-shaped faces.

27. The device of claim 18, wherein the plate members have heart-shaped faces.

28. The device of claim 18, wherein the coupling means for coupling the seat tube proximal end with the seat tube distal end is a coupling assembly.

29. The device of claim 18, wherein the coupling means for coupling the seat tube proximal end with the seat tube distal end is a tube segment insertable into the seat tube proximal end and the seat tube distal end, the seat tube and tube segment having non-circular cross-sections.

30. The device of claim 18, wherein the coupling means for coupling the seat tube proximal end with the seat tube distal end is a tube segment insertable into the seat tube proximal end and the seat tube distal end, the seat tube and the tube segment having circular cross sections for at least the length of the tube segment insertion.

31. The device of claim 18, wherein the openings have shoulder portions extending from and integral to the plate member rears.

32. The device of claim 18, wherein the openings have shoulder portions extending from and integral to the plate member faces.

33. The device of claim 32, wherein the shoulder portions further comprise seating projections, and the openings in the plate member faces further comprise seating recesses.

34. The device of claim 18, wherein the plate members monolithically extend from the tubes that the plate members fasten together.

35. The device of claim 18, wherein the plate member rears further comprise plate member tubes adapted for inserting into forward and rearward sections of forward assembly tubes, the plate member tubes monolithically extending from the plate member rears.

36. The device of claim 18, wherein the plate member rears further comprise plate member tubes adapted for inserting over forward and rearward sections of forward assembly tubes, the plate member tubes monolithically extending from the plate member rears.

37. The device of claim 18, wherein the tubes are made of a material selected from the group consisting of aluminum, aluminum alloy, carbon fiber, steel and titanium.

* * * * *